(12) United States Patent
Ballard (10) Patent No.: US 7,891,743 B2
(45) Date of Patent: Feb. 22, 2011

(54) LOCKING HUB CAP FOR WHEEL HUB ASSEMBLY

(76) Inventor: Claudio R. Ballard, 26 S. Compass Dr., Ft. Lauderdale, FL (US) 33308

( * ) Notice: Subject to any disclaimer, the term of this patent is extended or adjusted under 35 U.S.C. 154(b) by 0 days.

(21) Appl. No.: 12/394,410

(22) Filed: Feb. 27, 2009

(65) Prior Publication Data

US 2009/0267405 A1 Oct. 29, 2009

Related U.S. Application Data

(60) Provisional application No. 61/034,875, filed on Mar. 7, 2008.

(51) Int. Cl.
*B60B 27/06* (2006.01)
(52) U.S. Cl. .............. 301/35.63; 301/35.58; 301/108.1; 301/105.1
(58) Field of Classification Search .............. 301/35.58, 301/35.63, 105.1, 108.1, 108.2, 108.3, 108.4, 301/108.5, 111.04; 70/225
See application file for complete search history.

(56) References Cited

U.S. PATENT DOCUMENTS

| | | | | |
|---|---|---|---|---|
| 2,046,779 | A | * | 7/1936 | Hack ........................ 301/35.58 |
| 3,351,364 | A | | 11/1967 | Warn et al. |
| 4,138,160 | A | * | 2/1979 | Lohmeyer ................. 301/108.4 |
| 4,591,211 | A | | 5/1986 | Browning et al. |
| 4,825,669 | A | | 5/1989 | Herrera |
| 5,352,026 | A | * | 10/1994 | Snook ...................... 301/105.1 |
| 5,431,485 | A | | 7/1995 | Hayashi |
| 5,492,391 | A | * | 2/1996 | Snook ...................... 301/35.58 |
| 5,533,794 | A | * | 7/1996 | Faison ...................... 301/105.1 |
| 5,584,537 | A | * | 12/1996 | Miansian .................. 301/35.63 |
| 5,820,224 | A | * | 10/1998 | Dimatteo, Jr. ............ 301/35.58 |
| 5,941,105 | A | * | 8/1999 | Macey .......................... 70/225 |
| 6,116,700 | A | | 9/2000 | Herrera |
| 6,322,158 | B1 | * | 11/2001 | Herrera ................... 301/111.04 |
| 7,547,077 | B2 | * | 6/2009 | Melberg et al. ........... 301/108.1 |
| 7,585,031 | B2 | * | 9/2009 | White et al. .............. 301/105.1 |
| 2003/0015909 | A1 | * | 1/2003 | Meek, Jr. .................... 301/10.1 |
| 2007/0096546 | A1 | * | 5/2007 | Thomas et al. ........... 301/108.5 |

OTHER PUBLICATIONS

PCT: International Search Report of PCT/US2009/035615 (related application); Jul. 14, 2009; 2 pgs.
PCT: Written Opinion of the International Searching Authority of PCT/US2009/035615 (related application); Jul. 14, 2009; 5 pgs.

\* cited by examiner

*Primary Examiner*—S. Joseph Morano
*Assistant Examiner*—Kip T Kotter
(74) *Attorney, Agent, or Firm*—Howison & Arnott, L.L.P.

(57) ABSTRACT

The present disclosure provides a locking hub cap having at least one locking feature that engages at least one locking feature on a vehicle hub assembly to prevent a spin-on nut from being removed while the locking hub cap is in place.

11 Claims, 7 Drawing Sheets

LOCKING HUB CAP FOR WHEEL HUB ASSEMBLY

CROSS-REFERENCE TO RELATED APPLICATIONS

This application claims the benefit of U.S. Provisional Application for Patent Ser. No. 61/034,875, filed Mar. 7, 2008, and entitled LOCKING HUB CAP FOR WHEEL HUB ASSEMBLY, the specification of which is incorporated herein in its entirety by reference.

TECHNICAL FIELD

The following disclosure relates to vehicle wheel assemblies and, more particularly, to a locking hub cap for a spin-on nut.

BACKGROUND

It is well known to use multiple fasteners such as lug nuts to couple a wheel to a vehicle. It is also well known to use a single fastener such as a spinner to couple a wheel to a vehicle. However, particularly in the case of a single fastener, there is a concern that the fastener might loosen while the vehicle is in motion, allowing the wheel to wobble or come off the vehicle entirely. Therefore, a need exists for an improved locking solution for a vehicle mounted wheel.

SUMMARY

In one embodiment, the present disclosure provides a hub assembly comprising a hub, a spin-on nut, and a locking hub cap. The hub has a base and a hub shaft extending substantially perpendicularly from the base. The hub shaft includes a threaded surface and at least a first locking feature. The spin-on nut has a threaded bore formed therethrough, wherein threads of the threaded bore are configured to engage threads of the threaded surface. The locking hub cap has at least a second locking feature configured to engage the first locking feature in a releasable manner. The first and second locking features resist movement of the locking hub cap in a direction substantially parallel to the hub shaft when engaged.

In another embodiment, the present disclosure provides a locking hub cap comprising a base having an inner and outer surface, a shaft extending substantially perpendicularly from the inner surface, and at least a first locking feature. The first locking feature is positioned on the shaft and configured to align with at least a second locking feature positioned on a vehicle hub assembly. The base is rotatable relative to the vehicle hub assembly to align the first locking feature with the second locking feature. Alignment of the first and second locking features enables the locking hub cap to remain coupled to the vehicle hub assembly when pressure is applied in a direction substantially parallel to the shaft towards the inner surface.

In still another embodiment, the present disclosure provides a hub assembly comprising a hub, a spin-on nut, and a locking hub cap. The hub has a base and a hub shaft extending substantially perpendicularly from the base. The hub shaft includes an external surface that is at least partially threaded and a first locking feature. The spin-on nut has a plurality of arms extending at an angle from a central nut portion. The central nut-portion includes a threaded bore having threads that are configured to engage threads of the external surface. An exterior surface of the central nut portion includes a circular indentation centered around the threaded bore. The locking hub cap has at least a second locking feature configured to align with the first locking feature to engage the locking hub cap with the hub in a releasable manner. The first and second locking features are configured to enable the locking hub cap to resist movement relative to the hub in a direction substantially parallel to the hub shaft and away from the hub. An interior edge of the locking hub cap fits within the circular indentation of the spin-on nut.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of a locking hub cap for wheel hub assembly. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1A:
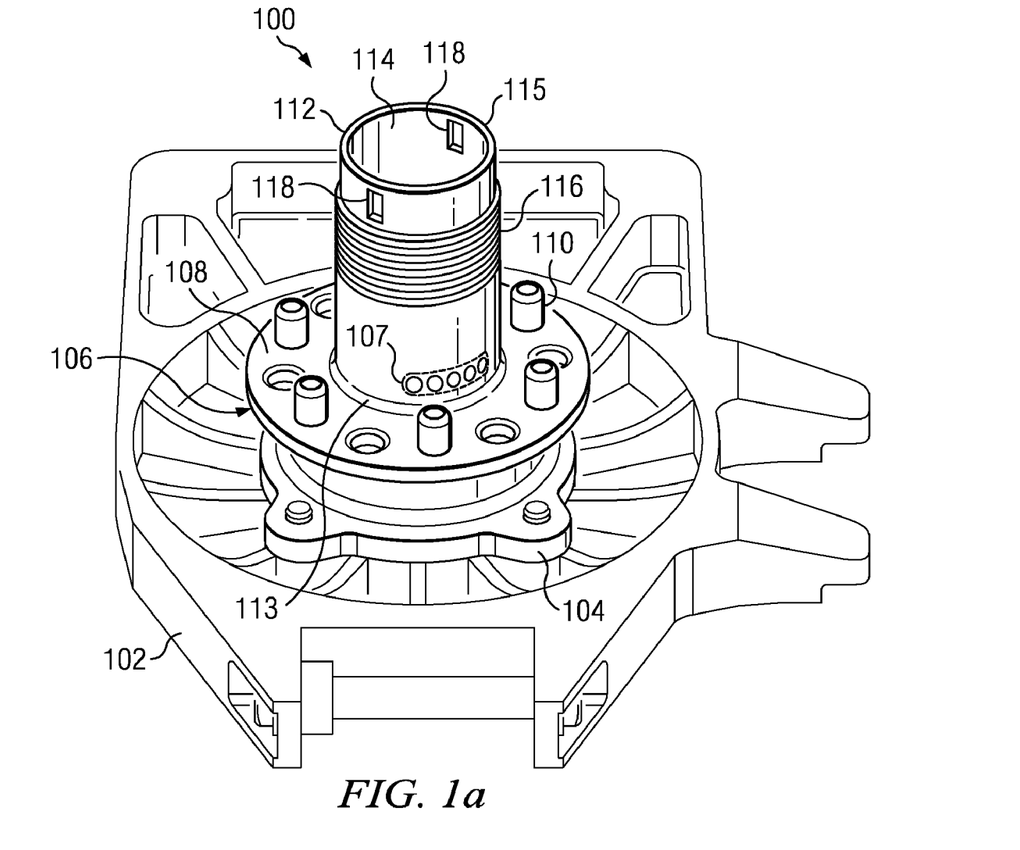
FIGS. 1a and 1b illustrate two perspective views of a hub assembly in accordance with one embodiment of the present disclosure.
Figure 1B:
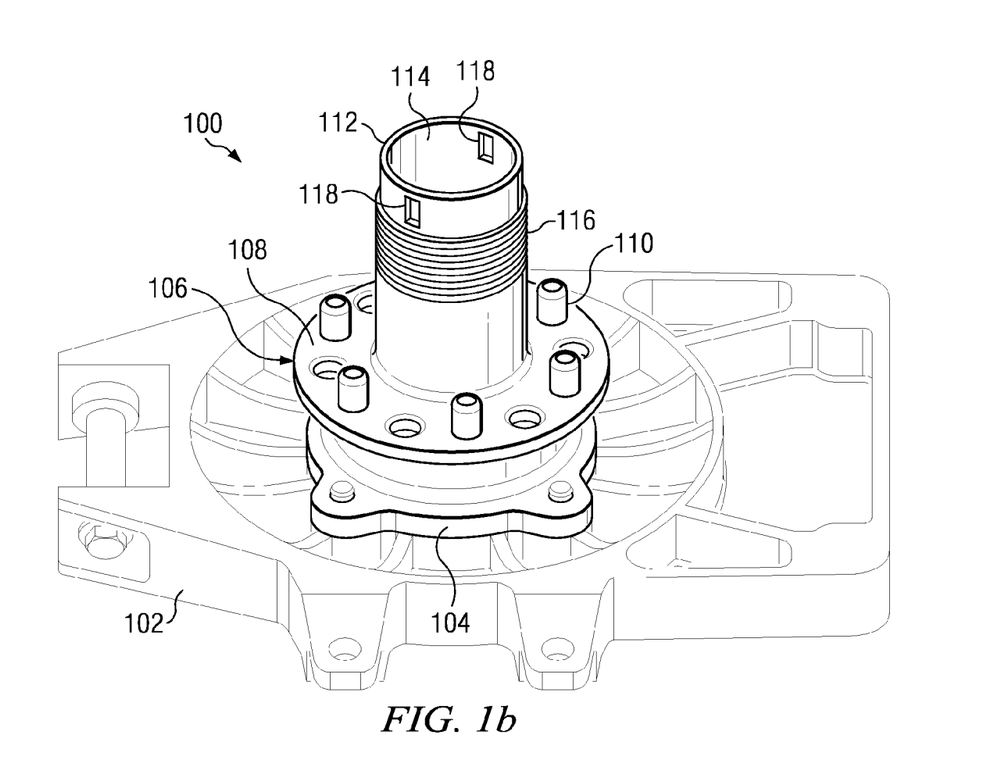

Referring to FIGS. 1a and 1b, one embodiment of a hub assembly 100 that may be used to couple a wheel to a vehicle is illustrated. The hub assembly 100 includes a suspension member 102, a spindle 104, a bearing assembly 107, and a hub 106. The suspension member 102 may be coupled to suspension arms or other members of a vehicle (not shown). The spindle 104 is coupled to the suspension member 102 in such a way that the spindle cannot rotate relative to the suspension member. For example, the spindle 104 may be coupled to the suspension member 102 using multiple screws or bolts that pass through holes in the spindle. The hub 106 may be coupled to the spindle 104 in a rotatable manner. For example, bearing assembly 107 may be positioned between the hub 106 and spindle 104 to both retain the hub on the spindle and to allow rotation of the hub relative to the spindle.

The hub 106 includes a substantially flat base 108 having multiple protrusions 110 (e.g., studs) configured to engage corresponding cavities (e.g., stud holes) in a wheel (not shown). A shaft 112 is substantially centered on the base 108 and sized to fit within a center bore in the wheel. The shaft 112 includes a first inner end 113 adjacent to base 108, a second outer end 115 opposite first end 113, a bore 114, one or more locking features 118, which may be apertures, protrusions, threads, etc., and a circumferentially threaded exterior surface 116 extending over a portion of shaft 112 substantially between locking features 118 and first, inner end 113 of the shaft. In the present example, the locking features 118 are slotted apertures, and it is understood that the aperture configuration may vary and may include different numbers, positions, and shapes of apertures. Accordingly, the use of two slots in the present example is only one possible configuration of the locking features 118. Although not shown, it is understood that other components, such as rotors for disc brakes, may be coupled to the hub assembly 100.

Figure 2:
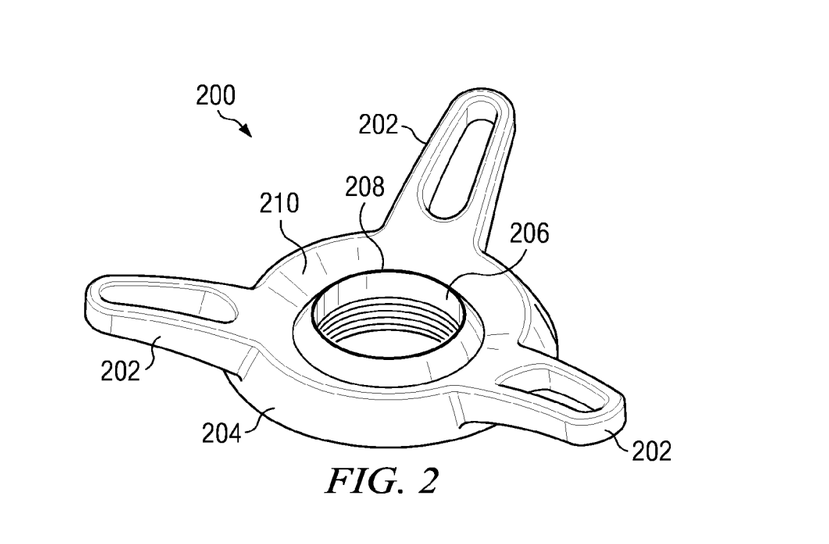
FIG. 2 illustrates a perspective view of one embodiment of a spin-on nut that can be used with the hub assembly of FIGS. 1a and 1b.

Referring to FIG. 2, one embodiment of a spin-on nut 200 that may be used with the hub assembly 100 of FIG. 1 is illustrated. The spin-on nut 200 includes arms 202 extending from a nut portion 204. Although three arms are shown, it is understood that the number, placement, and shape of the arms may vary in other embodiments. The nut portion 204 includes a bore 206 that is at least partially threaded, with the threads configured to engage the threaded surface 116 of the shaft 112. In the present embodiment, a raised lip 208 extends around the bore 206 and slopes down into an indentation 210 formed in the body of the nut portion 204.

Figure 3:
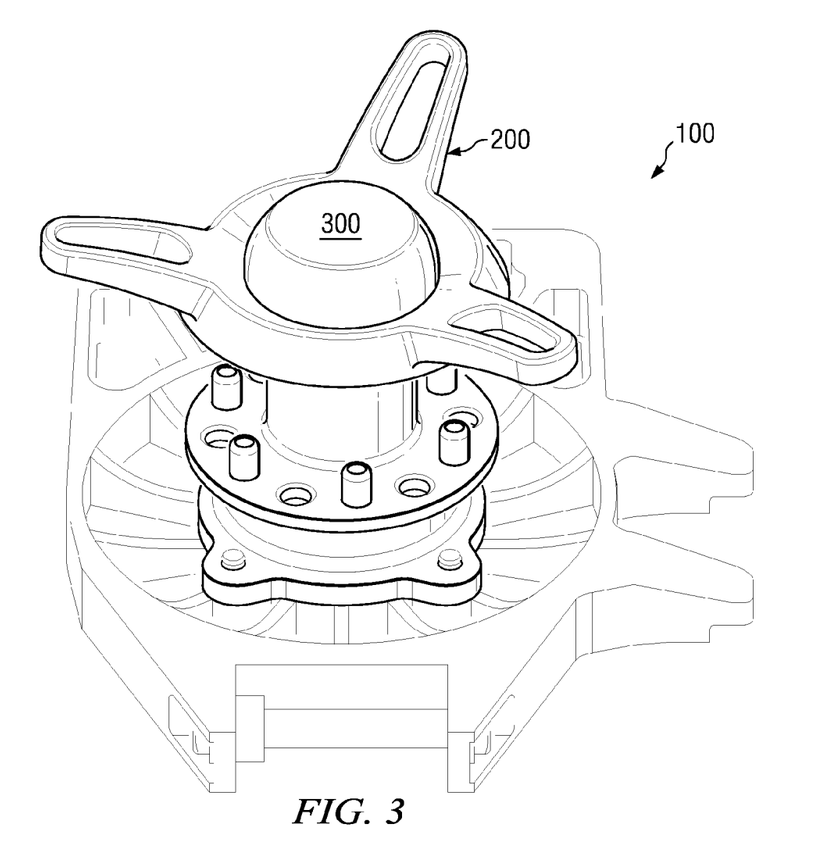
FIG. 3 illustrates a perspective view of the hub assembly of FIGS. 1a and 1b with the spin-on nut of FIG. 2 and one embodiment of a locking hub cap.

Referring to FIG. 3, the hub assembly 100 of FIGS. 1a and 1b is illustrated with the spin-on nut 200 of FIG. 2 and a locking hub cap 300. As illustrated, locking hub cap 300 is configured to fit over the end of shaft 112 with an outer end portion 302 of the locking hub cap extending axially beyond and exposed outwardly beyond spin-on nut 200. In the present example, the spin-on nut 200 is threadably engaged to the shaft 112 via the threaded surface 116. The locking hub cap 300 is configured with one or more locking features (not shown) configured to engage locking features 118, thereby preventing the spin-on nut 200 from backing off of the shaft 112 as well as providing an aesthetically pleasing cover for an outer end of the shaft. An outer edge of the locking hub cap (e.g., the edge abutting or proximal to the spin-on nut 200) may be positioned in the indentation 210.

Figure 4:
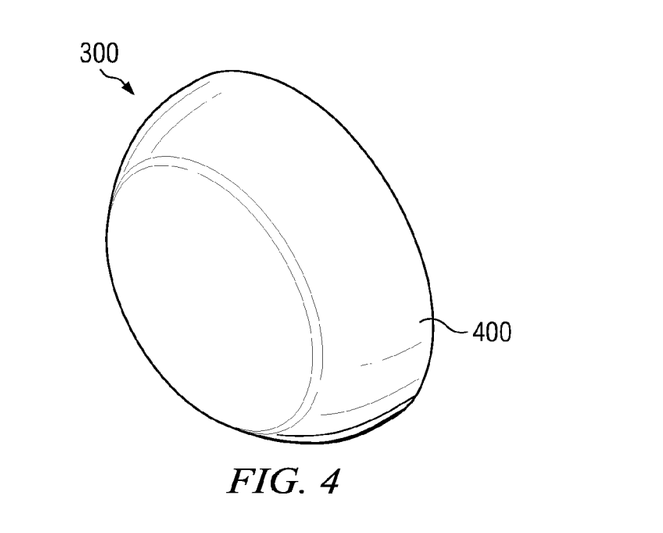
FIG. 4 illustrates a perspective view of one embodiment of a locking hub cap.

Referring to FIG. 4, one embodiment of an exterior surface 400 of the locking hub cap 300 is illustrated. It is understood that while the exterior surface 400 in the present example is relatively smooth, other embodiments of the locking hub cap 300 may have exterior surfaces 400 that are of many different dimensions, shapes, and textures (e.g., to provide one or more gripping surfaces).

Figure 5A:
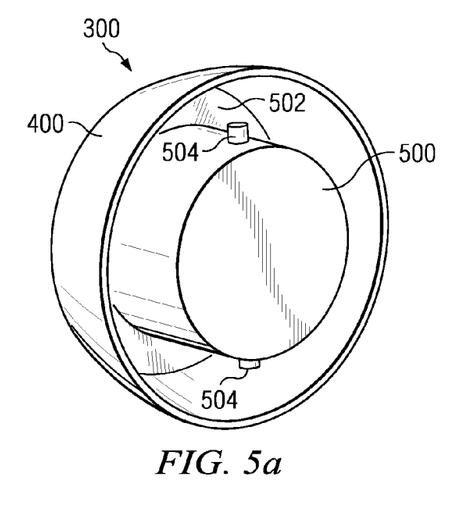
FIGS. 5a-5c illustrate diagrammatic views of various embodiments of the locking hub cap of FIG. 4.
Figure 5B:
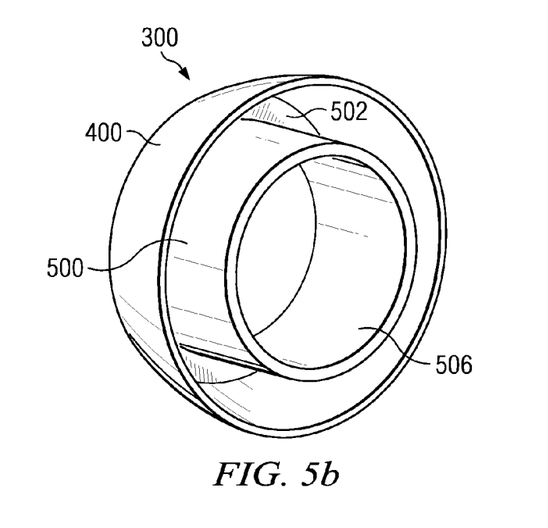
Figure 5C:
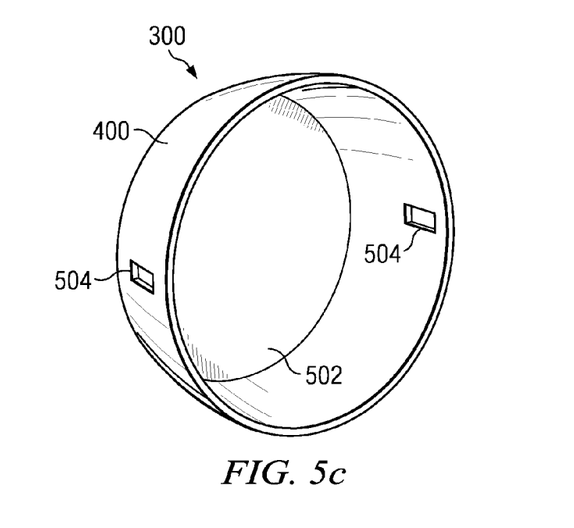

With additional reference to FIGS. 5a-5c, different embodiments of the locking hub cap 300 of FIG. 3 are illustrated. The locking hub cap 300 in the various embodiments of FIGS. 5a-5c is not necessarily to scale and may be simplified in order to better illustrate various features. In the present examples, the locking hub cap 300 is to resist outward pressure from the spin-on nut 200 that may be applied substantially parallel to a longitudinal axis of the shaft 112, but may rotate during placement and removal. In some embodiments, the locking hub cap 300 may rotate even after placement as long as it is resistive to the outward pressure that may be applied by the spin-on nut 200.

Referring specifically to FIG. 5a, the locking hub cap 300 includes a shaft 500 extending substantially perpendicularly from an inner surface 502. The shaft 500 may be sized to fit within the bore 114 of the shaft 112. The shaft 500 includes one or more locking features 504 that may be coupled to or formed out of the shaft. In the present example, the locking features 504 are protrusions configured to engage the locking features 118 (i.e., apertures) of the shaft 112. For example, the protrusions 504 may be coupled to a spring mechanism that forces the protrusions through the apertures 118 when the protrusions and apertures are aligned.

In operation, the locking hub cap 300 may be placed over the spin-on nut 200 and the shaft 500 inserted at least partially into the bore 114. If spring loaded, the protrusions 504 may be forced into the body of the shaft 500. The locking hub cap 300 may be rotated either during insertion of the shaft 500 or afterwards to align the protrusions 504 with the apertures 118. Once aligned, the protrusions 504 may enter the apertures 118 to retain the locking hub cap 300 on the hub assembly 100, which in turn prevents the removal of the spin-on nut 200.

In an alternative embodiment, the shaft 500 may contain a lock mechanism that uses a key for purposes of actuation. A key hole (not shown) may be placed on the exterior surface 400 and aligned with the shaft 500. In operation, a key may be inserted into the key hole and turned, thereby actuating the lock mechanism and forcing the protrusions 504 through the apertures 118. To remove the locking hub cap 300, the key may again be inserted and turned, thereby withdrawing the protrusions 504 out of the apertures 118 and back into the shaft 500.

Referring specifically to FIG. 5b, the locking hub cap 300 includes the shaft 500 extending substantially perpendicularly from the inner surface 502. In the present embodiment, the shaft 500 includes a bore 506 sized to receive the shaft 112. The shaft 500 includes one or more locking features (not shown) positioned inside the bore 506. In the present example, the locking features are protrusions configured to engage the locking features 118 (i.e., apertures) of the shaft 112, such as the protrusions described previously with respect to FIG. 5a.

In operation, the locking hub cap 300 may be placed over the spin-on nut 200 and the shaft 112 inserted at least partially into the bore 506. If spring loaded, the protrusions may be forced into the body of the shaft 500. The locking hub cap 300 may be rotated either during insertion of the shaft 112 or afterwards to align the protrusions with the apertures 118. Once aligned, the protrusions may enter the apertures 118 to retain the locking hub cap 300 on the hub assembly 100, which in turn prevents the removal of the spin-on nut 200.

Referring specifically to FIG. 5c, the locking hub cap 300 includes one or more locking features 504 that are apertures. In some embodiments, multiple aligned apertures 504 may be provided that form a path from the exterior surface 400 on one side of the locking hub cap 300 through to the exterior surface 400 on the other side of the locking hub cap. If the shaft 500 is present in the locking hub cap 300, an aperture that aligns with the other apertures 504 may extend through the shaft. When the locking hub cap 300 is in place on the hub assembly 100 and the apertures 504 are aligned with the apertures 118, a locking member (not shown) such as a pin or a bar may be inserted through the aligned apertures. The locking member may have a spring loaded bearing on the end that is inserted through the apertures or may have other means for preventing the locking member from easily sliding out of the apertures.

It is understood that there are many different embodiments of locking features that may be used with the hub 106 and locking hub cap 300. For example, with respect to the hub 106, locking features may be located on the inside and/or outside surfaces of the shaft 112 or may be located elsewhere on the hub. With respect to the locking hub cap 300, the locking features may be located on the inside and/or outside surfaces of the shaft 500, on an interior surface of the locking hub cap itself, or elsewhere.

Furthermore, the locking features may be reversed from those shown. For example, the shaft 112 may have protrusions that are configured to fit into cavities or apertures in the locking hub cap 300. In other embodiments, rather than protrusions or apertures such as those shown, the shaft 112 and/or locking hub cap 300 may have a protruding lip or indented ring. In still other embodiments, a friction or interference fit may be used. In other embodiments, the shaft 112 and locking hub cap 300 may be threaded, and the direction of the threads may be reversed from the direction of the threads of the threaded surface 116 and bore 206. Although not shown, some surfaces of the protrusions and aperture/cavity edges may be angled or curved to assist in placement and removal of the locking hub cap 300 when pressure is applied in a certain direction (e.g., rotational pressure), and other surfaces may be flat or angled to resist pressure applied from another direction (e.g., pressure parallel to the longitudinal axis of the shaft 112). In still other embodiments, a mechanism may be coupled to the protrusions to aid in the extension and retraction of the protrusions upon the application of specific pressure (e.g., rotational pressure).

Figure 6A:
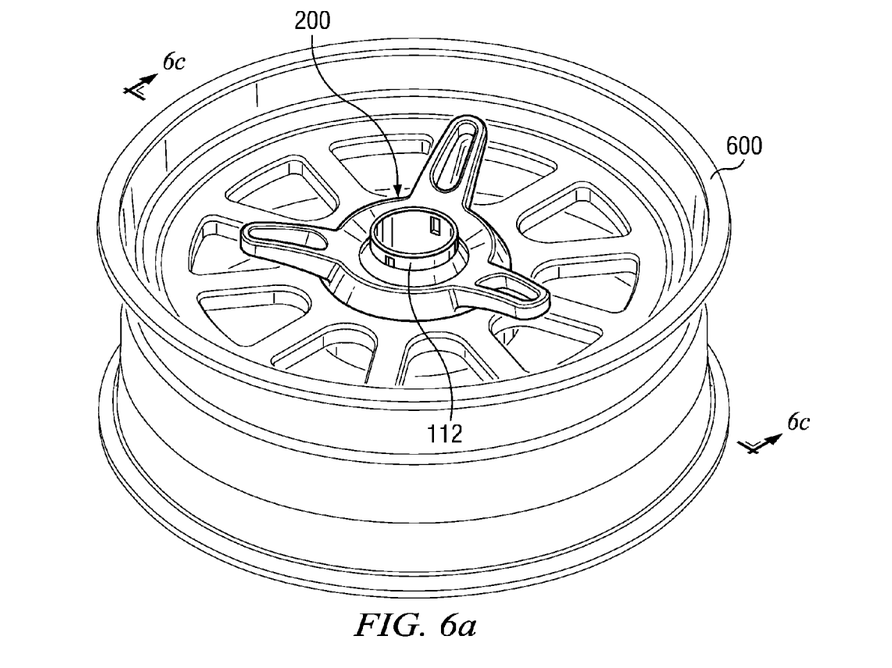
FIGS. 6a-6c illustrate a perspective view, a top view, and a cross-sectional view, respectively, of one embodiment of a wheel assembly with the spin-on nut of FIG. 2.
Figure 6B:
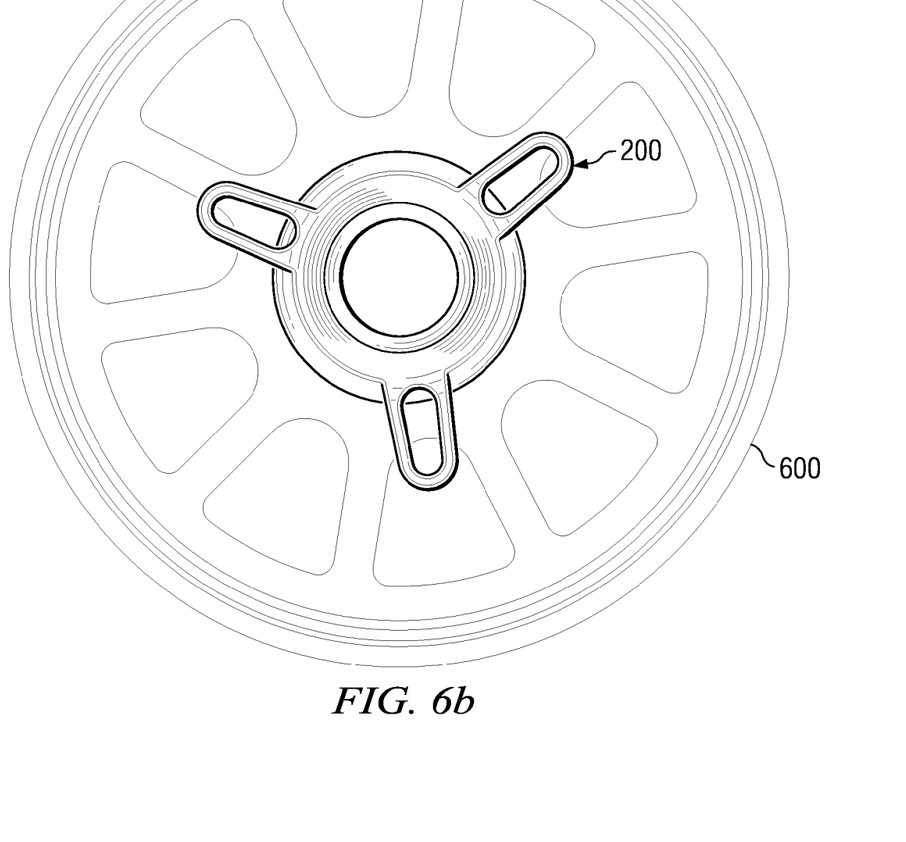
Figure 6C:
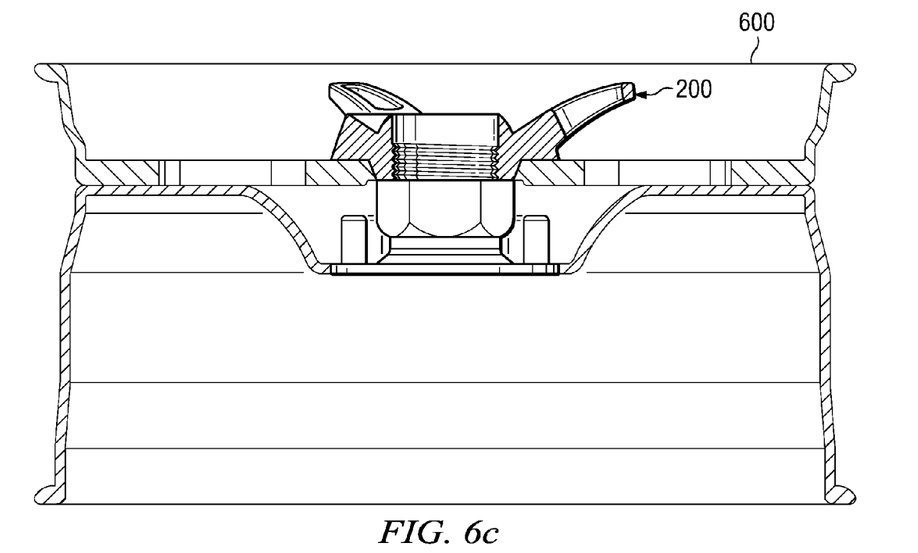

Referring to FIGS. 6a-6c, one embodiment of a wheel 600 is illustrated with the spin-on nut 200 of FIG. 2 in perspective, top, and cross-sectional views, respectively.

Figure 7:
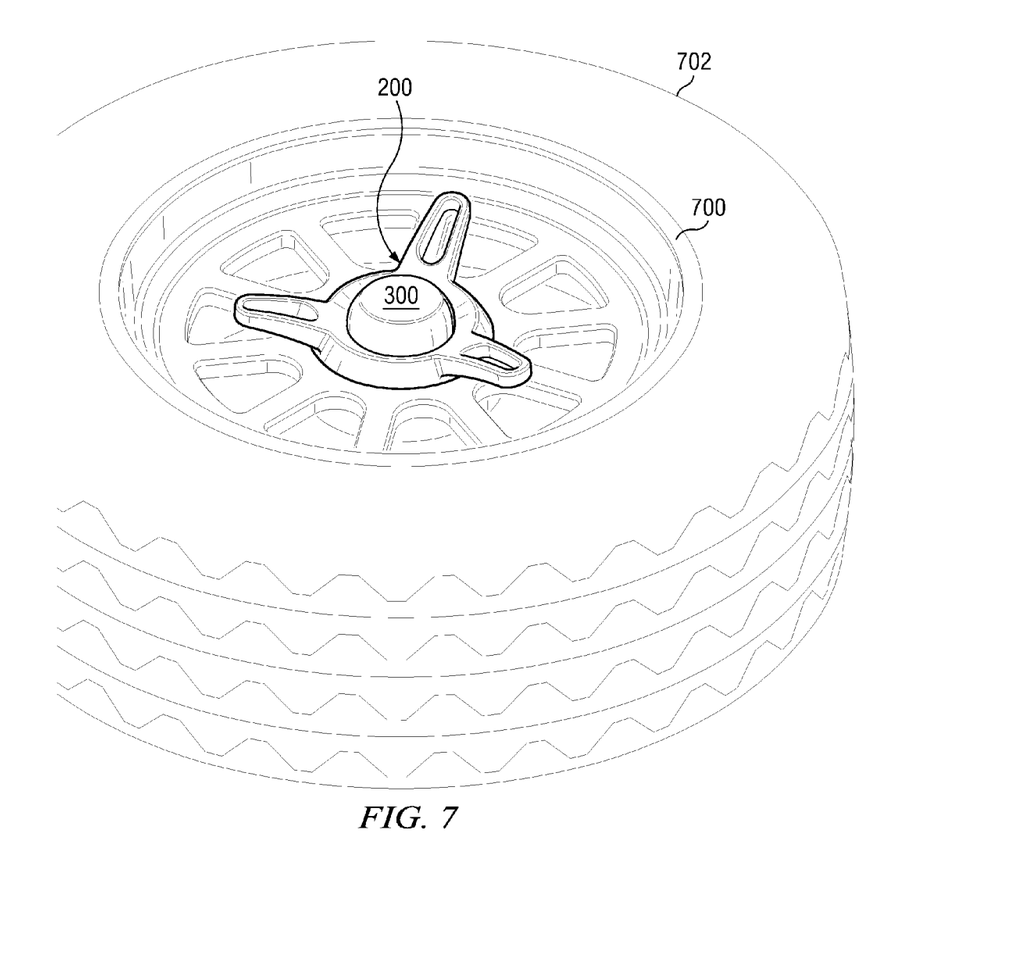
FIG. 7 illustrates a perspective view of one embodiment of a wheel assembly and tire with the spin-on nut of FIG. 2 and locking hub cap of FIG. 3.

Referring to FIG. 7, one embodiment of a wheel assembly 700 and tire 702 is illustrated with the spin-on nut 200 of FIG. 2 and locking hub cap 300 of FIG. 3 in a perspective view.

It will be appreciated by those skilled in the art having the benefit of this disclosure provides a locking hub cap for wheel hub assembly. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A hub assembly comprising:
a hub having a base and a hub shaft extending substantially perpendicularly from the base, the hub shaft having an outer end opposite the base, wherein the hub shaft includes a threaded surface over a portion thereof and at least a first locking feature positioned between the threaded surface and the outer end of the hub shaft;
a spin-on nut having a threaded bore formed therethrough, wherein threads of the threaded bore of the spin-on nut are configured to engage threads of the threaded surface of the hub shaft with the first locking feature positioned between the spin-on nut and the outer end of the hub shaft when the spin-on nut is fully engaged with the hub shaft, the spin-on nut including an indentation extending around the periphery of the threaded bore and configured to receive an outer edge of the locking hub cap in the indentation; and
a locking hub cap configured to fit over the outer end of the shaft with an outer end portion of the locking hub cap extending beyond and exposed outwardly beyond the spin-on nut, the locking hub cap having at least a second locking feature configured to engage the first locking feature in a releasable manner, wherein the first and second locking features resist movement of the locking hub cap in a direction substantially parallel to the hub shaft when engaged.

2. The hub assembly of claim 1 further comprising a bearing assembly and a spindle coupled to the base, wherein the bearing assembly enables the spindle to rotate relative to the base.

3. The hub assembly of claim 1 wherein one of the first and second locking features is a protrusion and the other of the first and second locking features is a cavity configured to receive the protrusion.

4. The hub assembly of claim 3 wherein the locking hub cap includes a shaft member on which the second locking feature is located.

5. The hub assembly of claim 4 wherein the hub shaft includes a bore centered on a longitudinal axis of the hub shaft and wherein the shaft member is sized to fit within the bore.

6. The hub assembly of claim 4 wherein the shaft member includes a bore centered on a longitudinal axis of the shaft member and wherein the hub shaft is sized to fit within the bore.

7. A locking hub cap comprising:
a base having an inner and outer surface;
a shaft extending substantially perpendicularly from the inner surface;
at least a first locking feature positioned on the shaft and configured to align with at least a second locking feature positioned on a vehicle hub assembly, wherein the base is rotatable relative to the vehicle hub assembly to align the first locking feature with the second locking feature, and wherein alignment of the first and second locking features enables the locking hub cap to remain coupled to the vehicle hub assembly when pressure is applied in a direction substantially parallel to the shaft towards the inner surface; and
wherein the shaft of the locking hub cap is configured to engage the vehicle hub assembly with a portion of the locking hub cap extending beyond and exposed through a spin-on nut engaged with the vehicle hub assembly with an outer surface of the locking hub cap positioned in a generally circular indentation in the spin-off nut.

8. The hub locking cap of claim 7 wherein one of the first and second locking features is a protrusion and the other of the first and second locking features is a cavity configured to receive the protrusion.

9. The locking hub cap of claim 7 wherein the shaft includes a bore centered around a longitudinal axis of the shaft, wherein the bore is configured to receive a hub shaft of the vehicle hub assembly.

10. A hub assembly comprising:
a hub having a base and a hub shaft extending substantially perpendicularly from the base, wherein the hub shaft includes an external surface that is at least partially threaded and a first locking feature;
a spin-on nut having a plurality of arms extending at an angle from a central nut portion, wherein the central nut-portion includes a threaded bore having threads that are configured to engage threads of the external surface, and wherein an exterior surface of the central nut portion includes a circular indentation centered around the threaded bore;
a locking hub cap having at least a second locking feature configured to align with the first locking feature to engage the locking hub cap with the hub in a releasable manner, wherein the first and second locking features are configured to enable the locking hub cap to resist movement relative to the hub in a direction substantially parallel to the hub shaft and away from the hub, and wherein an interior edge of the locking hub cap fits within the circular indentation of the spin-on nut such that the locking hub cap encloses the end of the hub shaft and extends axially outward from the spin-off nut such that the end of the locking hub cap is exposed outwardly and axially beyond the spin-off nut.

11. The hub assembly of claim 10 wherein one of the first and second locking features is a protrusion and the other of the first and second locking features is a cavity configured to receive the protrusion.

* * * * *